United States Patent
Uosaki et al.

(10) Patent No.: US 6,916,588 B2
(45) Date of Patent: Jul. 12, 2005

(54) BINDER RESIN FOR TONER AND TONER

(75) Inventors: Hirotaka Uosaki, Sodegaura (JP); Hiroyuki Takei, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 41 days.

(21) Appl. No.: 10/448,016

(22) Filed: May 30, 2003

(65) Prior Publication Data

US 2004/0068052 A1 Apr. 8, 2004

(30) Foreign Application Priority Data

Jun. 3, 2002 (JP) ........................................ 2002-162224

(51) Int. Cl.$^7$ .............................................. G03G 9/087
(52) U.S. Cl. ................................ 430/109.3; 430/109.4; 430/109.5
(58) Field of Search ........................ 430/109.3, 109.4, 430/109.5

(56) References Cited

U.S. PATENT DOCUMENTS

| | | | | |
|---|---|---|---|---|
| 5,310,796 A | * | 5/1994 | Warren et al. | 525/92 C |
| 5,384,363 A | * | 1/1995 | Yates, III | 525/89 |
| 5,462,829 A | | 10/1995 | Tyagi et al. | |

FOREIGN PATENT DOCUMENTS

| | | |
|---|---|---|
| EP | 1 011 031 A | 6/2000 |
| JP | 04-250462 A | 9/1992 |
| JP | 07-084407 A | 3/1995 |

* cited by examiner

*Primary Examiner*—Jeffrey Mullis
(74) *Attorney, Agent, or Firm*—Burns, Doane, Swecker & Mathis, LLP

(57) ABSTRACT

A binder for a toner containing a polyester resin (A); and a block copolymer (B) comprising a block comprising a sequence of ethylene hydrocarbon and/or a conjugated diene hydrocarbon-derived constituent units, and a block comprising a sequence of styrene-derived constituent units; and/or the hydrogenated product of the block copolymer, i.e., the hydrogenated block copolymer. The binder can be used in a toner which can exhibit superior fixing properties, offset resistance, development durability or the like. Thus, it is possible to satisfy the needs of the markets that require a high-speed printer, low-temperature fixing properties or the like. Recycled PET products can also be used for raw materials, thus contributing to the recycle society.

6 Claims, No Drawings

BINDER RESIN FOR TONER AND TONER

BACKGROUND OF THE INVENTION

1. Field of the Invention

The present invention relates to a binder resin for a toner used for development of an electrostatic image in electrophotography, electrostatic printing and the like, and a toner containing the binder resin for electrophotography. Also, the present invention relates to a binder resin for a toner and a toner containing a polyester resin.

2. Background of the Related Art

With the progress of office automation, the demand for electrophotography-based copying machines and printers has increased rapidly and performance requirements for such equipment have become higher.

There is a generally used method which comprises forming an electrostatic latent image on the photo-sensitive material, then developing the image using a toner, transferring the toner image onto a fixing sheet such paper or the like, and heat-pressing the transferred toner image using heat roll (a heat roll fixing method). In this heat roll fixing method, in order to achieve enhanced economical efficiency in powder consumption and increased photography speed, and to prevent papers from being curled, a toner superior in fixing properties is needed, which can be fixed at a lower temperature. On the other hand, there is such a problem, a so-called offset phenomenon, in the heat roller fixing method that since a toner is contacted with the surface of the heating roll in the melt state of the toner, the toner is transferred by adhering on the surface of the heating roll, and the transferred toner is transferred again on the next sheet to be fixed to contaminate it. Even without causing this offset phenomenon, high performance requirements are demanded as one of the important performance requirements for the toner. Meanwhile, as copiers and printers have come to employ a higher speed, high performance requirements in electrified portions have increased. That is, a higher durability is required for a toner and a longer-term stability in printing is needed.

In the conventional technique, there has been proposed a method to improve the molecular weight and molecular weight distribution of a binder resin for a toner. Concretely, it has been tested to have a binder resin of a low-molecular weight and to lower the fixing temperature. However, the melting point has been lowered owing to the lowered molecular weight whereas the cohesive force of a resin was also deteriorated simultaneously. Therefore, an offset phenomenon occurs to the fixing roller. In order to prevent such a problem, its has been attempted to use a binder resin having a wide molecular weight distribution by mixing a high molecular weight resin and a low-molecular weight resin, or, further to crosslink the high molecular weight portion of the binder resin or the like. With this method, however, it is difficult to satisfy the fixing properties owing to the increased viscosity of the resin. As a binder resin for a toner using the above method, in general, a styrene acrylic resin (e.g. 55-6895B and JP 63-32180B, U.S. Pat. No. 5,084,368, etc), a polyester resin (e.g. JP61-284771A, JP62-291668A, JP07-101318A, specification of U.S. Pat. No. 4,833,057), or a polyol resin (e.g. JP11-189647A, etc.) is mainly used.

However, the toners obtained by these techniques cannot be fully effective in high-speed copiers or small copiers in which the amount of heat from the heat fixing roll is not sufficiently transmitted. That is, when a polymer having a high weight-average molecular weight or a crosslinked polymer is used in order to prevent the offset phenomenon, the viscosity of a resin increases so that the fixing properties are deteriorated.

In order to achieve these requirements, there is a method to add paraffin waxes, low-molecular weight polyolefin or the like as a mold release agent to a toner. In JP49-65232A, JP50-28840A, JP50-81342A or the like is disclosed a technique to use a styrene type binder resin. However, block resistance and the development properties have been deteriorated whereas an offset phenomenon has been improved. It is also confirmed that the effects of a mold release agent are small when applied to a polyester resin and the developing agent is rapidly depleted when its amount is increased.

In order to provide a developing agent having sufficient fixing properties and offset resistance and being capable of providing high image quality of copying images, it needs to give a sufficient electrophotographic features to the developing agent. Many methods have been attempted heretofore in order to achieve high image quality and high resolution of copying images; however, no perfect methods could be obtained heretofore to fully overcome the above defects.

Meanwhile, in recent years, an increase in population has increased the amount of energy and has depleted resources. In connection therewith, resources saving, energy saving, recycling of resources, etc. have been claimed. As to polyethylene terephthalate (PET) bottles, individual municipalities have started a recycling activity, and PET bottles have come to be utilized as clothes or containers. In addition, development of newly recycled items is desired. Thus, a toner using a polyester resin has become a strong candidate.

SUMMARY OF THE INVENTION

The present invention has an initial purpose of providing a binder resin for a toner and a toner satisfying various features that are required for toners from the past.

That is, an object of the present invention is to provide a binder resin for a toner and a toner that an offset is prevented without coating an offset preventive solution and which can be fixed at a lower fixing temperature in the heat fixing method.

An object of the present invention is to provide a binder resin for a toner and a toner superior in chargeability and grindability.

Another object of the present invention is to provide a binder resin for a toner and a toner to be able to obtain high-density development images which are always stable even at a high temperature and high humidity or at a low temperature and low humidity.

A further object of the present invention is to provide a binder resin for a toner and a toner to be able to form stable development images for a long period.

A further object of the present invention is to provide a binder resin for a toner and a toner having a weight-average particle diameter less than 10 micro-meters while suppressing a fine powder of less than 5 micro-meters in a small amount from the viewpoint of superior durability.

In order to solve the above problems, the present inventors have found a superior binder resin for a toner that cannot be realized by any of conventional techniques as a result of extensive review, thus completing the present invention.

The present invention is specified by the matters described in the following (1) to (8).

(1) A binder resin for a toner containing
(A) a polyester resin; and
(B) a block copolymer comprising
a block comprising a sequence of ethylenically unsaturated hydrocarbon-derived constituent units and/or conjugated diene hydrocarbon-derived constituent units, and
a block comprising a sequence of styrene-derived constituent units; and/or the hydrogenated product of the block copolymer, i.e., the hydrogenated block copolymer.
(2) A binder resin for a toner containing
100 weight parts of the polyester resin (A) and
0.1 to 20 weight parts of the block copolymer (B).
(3) A binder resin for a toner, wherein the polyester resin (A) is a urethane modified polyester resin (A-1) obtained by reacting
a polyester resin (a1) synthesized from a polycarboxylic acid and a polyhydric alcohol,
and a polyisocyanate (C).
(4) A binder resin for a toner, wherein the urethane modified polyester resin (A-1) is a urethane modified polyester resin (A-2) obtained by reacting
a polyisocyanate (C) and,
a polyester (a2) synthesized from
a polyethylene terephthalate (PET) and/or a polybutylene terephthalate (PBT),
a polycarboxylic acid and
a polyhydric alcohol.
(5) A binder resin for a toner, wherein the tetrahydrofuran (THF) soluble portion has a Mw(weight-average molecular weight)/Mn(number-average molecular weight) of 4 to 100 as measured by gel permeation chromatography (GPC).
(6) A binder resin for a toner, wherein the tetrahydrofuran (THF) soluble portion has a peak molecular weight of 1,000 to 30,000 as measured by gel permeation chromatography (GPC), and a glass transition temperature (Tg) of 40 to 75° C.
(7) A binder resin for a toner, wherein a styrene-derived constituent unit of the block copolymer (B) is 3 to 90% by weight.
(8) A toner containing the binder resin for a toner according to the above.

Other and further objects, features and advantages of the invention will appear more fully from the following description.

DETAILED DESCRIPTION OF THE PREFERRED EMBODIMENTS

The present invention will be described in more detail below. The block copolymer used in the present invention comprising a block comprising a sequence of the ethylenically unsaturated hydrocarbon-derived constituent units and/or the conjugated diene hydrocarbon-derived constituent units and a block comprising a sequence of the styrene-derived constituent units, and/or the hydrogenated product of the block copolymer, i.e., the hydrogenated block copolymer (B) is produced by polymerizing one or more of ethylenically unsaturated hydrocarbons such as ethylene, propylene, 1-butene, 2-butene, isobutylene, 1-pentene, 2-pentene, 2-methyl-1-butene, 3-methyl-1-butene, 2-methyl-2-butene, 1-hexene, 2,3-dimethyl-2-butene or the like, and conjugated diene hydrocarbons such as butadiene, isoprene or the like in accordance with a known living anionic polymerization or a living cationic polymerization to form a block copolymer having a reactive group, and then blocking this reactive group with styrene. The production process is not restricted thereto and known processes can also be employed. In addition, some kinds of the block copolymer have unsaturated double bonds; at that time, the block copolymer can be used as a so-called hydrogenated product obtained by reacting the unsaturated double bonds of the block copolymer with hydrogen in accordance with a known process.

Particularly, the block copolymer having unsaturated bonds might be subject to deterioration of heat while melt-kneading in production of the polyester resin, in urethane extending reaction by polyisocyanate or in production of the toner. Out of such a possibility, the block copolymer (B) having no unsaturated bonds is more desirable in the present invention. That is, a block copolymer synthesized by using an ethylene hydrocarbon such as ethylene, propylene and the like, or the hydrogenated block copolymer is preferred.

A commercial product can be used for the block copolymer (B). Such commercial products of the block copolymer include Kaliflex TR and Kraton (styrene-butadiene-styrene block copolymer, styrene-isoprene-styrene block copolymer, styrene-ethylene/butylenes-styrene block copolymer, styrene-ethylene/propylene-styrene block copolymer, styrene-ethylene/propylene block copolymer) produced by Kraton Polymer Co., Ltd., Septon (styrene-ethylene/propylene block copolymer or hydrogenated styrene-isoprene block copolymer) produced by Kuraray Co., Ltd. and Tufprene (styrene-butadiene block copolymer) produced by Asahi Kasei Co., Ltd or the like.

The amount of block copolymer to be used is usually 0.1 to 20 weight parts to 100 weight parts of the polyester resin (A) as described below, and more preferably 0.1 to 10 weight parts. Also, the ratio of styrene in the block copolymer is usually 3 to 90% by weight, and preferably 5 to 70% by weight.

It is possible to improve, for example, the productivity in a grindability process when producing the toner by adding the block copolymer (B), because a wax desirably used in the process of adding the block copolymer or producing toner as described below is properly dispersed in the toner.

There are no special restrictions on the process of mixing the block copolymer (B) and the polyester resin (A). For example, the block copolymer (B) may be added upon polycondensation for producing the polyester resin (A) or the polyester resin (a1) as described below and then preferably dissolved to provide a mixture, or may be added in the melted state after production of the polyester resin and dissolved to provide a mixture. Also the polyester resin (A) and the block copolymer (B) may be dissolved in the same solvent: to obtain a resin solution, and then the solvent is removed by heating to provide the resin mixture. In addition, the polyester resin (a1) can be subjected to a urethane extending reaction with a polyisocyanate in the presence of the block copolymer to obtain the urethane modified polyester resin. These may be melted and kneaded. The block copolymer (B) may also be added and melt-kneaded in production of a toner.

A known polyester resin can be used as a polyester resin (A) of the present invention. Specifically, the polyester resin (A) can be obtained by polycondensation of a polycarboxylic acid and a polyhydric alcohol, or ester exchange reaction of polycarboxylic ester and polyhydric alcohol.

Specifically, the polyester resin (a1) synthesized from a polycarboxylic acid and a polyhydric alcohol is reacted with a polyisocyanate (C) to obtain a urethane modified polyester (A-1). The resulting urethane modified polyester (A-1) is desirably used as the polyester resin (A). Also, the polyester resin such as PET or PBT resins including recycled products and a polyhydric alcohol are subjected to depolymerization and polycondensation or to polycondensation to obtain a polyester resin (a2). The polyester resin (a2) is reacted with a polyisocyanate (C) to obtain a urethane modified polyester (A-2). The resulting urethane modified polyester (A-2) can also be desirably used.

In the present invention, a method is described to conduct a synthesis of the polyester resin, followed by a urethanization reaction with a polyisocyanate to obtain a urethane modified polyester resin; however, the present invention is not necessarily restricted to this method, and other methods, for example, a polycondensation method in the presence of a diisocyanate can be used.

The polyester resin of the present invention is a resin obtained by polycondensation of polyhydric alcohol containing a dihydric alcohol or preferably a tri- or higher polyhydric alcohol component, and acid component selected from dicarboxylic acid, acid anhydrides thereof or lower alkyl esters thereof. It is also possible to use a monocarboxylic acid and a tri- or higher polycarboxylic acid for the purpose of molecular weight control.

As acid components of the present invention, there can be mentioned, for example, aliphatic dicarboxylic acids such as malonic acid, succinic acid, glutaric acid, adipic acid, azelaic acid, sebacic acid, and the like; unsaturated dicarboxylic acids such as maleic acid, fumaric acid, citraconic acid, itaconic acid and the like; aromatic dicarboxylic acids such as phthalic acid, terephthalic acid, isophthalic acid, phthalic anhydride and the like; and anhydrides or lower alkyl esters of these dicarboxylic acids. It is also possible to use a monocarboxylic acid and a tri- or higher polycarboxylic acid for the purpose of molecular weight control. As preferred monocarboxylic acids, there are mentioned aliphatic monocarboxylic acids such as octanoic acid, decanoic acid, dodecanoic acid, myristic acid, palmitic acid, stearic acid and the like, and they may have branches or unsaturated groups. These aliphatic monocarboxylic acids have an action of giving a reduced glass transition temperature; therefore, for the purpose of control of glass transition temperature, an aromatic monocarboxylic acid such as benzoic acid, naphthalenecarboxylic acid or the like may be used. As the tri- or higher carboxylic acid, there are mentioned, for example, trimellitic acid, pyromellitic acid and acid anhydrides thereof.

As the alcohol component, there can be mentioned, for example, alkyl diols such as ethylene glycol, 1,2-propylene glycol, 1,3-propanediol, 1,3-butanediol, 1,4-butanediol, 2,3-butanediol, diethylene glycol, triethylene glycol, dipropylene glycol, 1,5-pentanediol, 1,6-hexanediol, neopentyl glycol, 2-ethyl-1,3-hexanediol, etc.; alicyclic diols such as hydrogenated bisphenol A, cyclohexanedimethanol and the like; derivatives of bisphenol F and bisphenol S, such as, alkylene oxide obtained by reacting bisphenol F or bisphenol S with ethylene oxide, propylene oxide or the like; aromatic diols of dicarboxylic acid lower alkyl esters such as bishydroxyethylterephthalic acid, bishydroxypropylterephthalic acid, bishydroxybutylterephthalic acid and the like. There can be further mentioned, for example, bisphenol A derivative such as adducts of bisphenol A and alkylene oxide such as bisphenol A-ethylene oxide adducts, bisphenol A-propylene oxide adducts or the like. It is also possible to use a monohydric alcohol and a tri- or higher polyhydric alcohol for the purpose of molecular weight control. As preferred monohydric alcohols, there can be mentioned aliphatic monohydric alcohols such as octanol, decanol, dodecanol, myristyl alcohol, palmityl alcohol, stearyl alcohol and the like. They may have branches and unsaturated groups. As preferred tri- or higher polyhydric alcohols, there can be mentioned, for example, glycerine, 2-methylpropanetriol, trimethylolpropane, trimethylolethane, sorbitol, sorbitan or the like. When a chain-extending takes place by a polyisocyanate as described below, it is desirable to comprise at least 1 or more kinds of a tri- or higher polyhydric alcohol for obtaining a high molecular polymer fully. If the tri- or higher polyhydric alcohol component is less than 0.5 mole % usually based on all alcohol components, it is difficult to obtain a high molecular polymer when a chain-extending takes place by polyisocyanate and an offset resistance or durability tends to be poor. When the component is more than 20 mole %, a gelation takes place, making it difficult to do polycondensation. It is preferred that the component is preferably 0.5 to 20 mole % and more preferably 2 to 20 mole %.

PET and PBT used as a raw material in the present invention are not subject to the molecular weight distribution, composition, production process, and its form when used, etc. Any of new products, recycled products (preferably processed into a flake form), off-spec fiber waste or pellet discharged from the plant may be used. New products and recycled products into a flake form are preferred, in which the weight-average molecular weight is about 30,000 to 90,000.

The polycondensation reaction in obtaining the polyester resin can be conducted by a known process such as solvent-free high-temperature polycondensation, solution polycondensation or the like in an inert gas such as nitrogen gas or the like. In the reaction, the proportions of the carboxylic acid and alcohol used are generally 0.7 to 1.4 in terms of the molar ratio of the hydroxyl group of the latter to the carboxyl group of the former.

In the present invention, when the polyester resin (a2) is synthesized using PET, the polyester resin (a2) is produced by subjecting PET, a alcohol component comprising at least one kind of diol components, and at least one or more acid components to depolymerization and polycondensation or to polycondensation. The depolymerization and polycondensation may be carried out at the same time. The amount of PET to be used at this time is adjusted to have ethylene glycol component of 5 to 90 mole % in PET to all alcohol components containing ethylene glycol component in PET. A reaction temperature is preferably 200 to 270° C. and more preferably 220 to 260° C. When a reaction temperature is less than 200° C., the solubility of PET is lowered so that the reaction time becomes longer. When a reaction temperature is higher than 270° C., it incurs decomposition of the raw materials.

As the polyester resin (A) of the present invention, the polyester resin (a1) or the polyester resin (a2) may be used as it is; however the urethane modified polyester resin is more preferably used. The urethane modified polyester resin of the present invention is the polyester resin (A-1) to be obtained by subjecting the polyester resin (a1) and the polyisocyanate (C) to reaction and, in particular, the urethane modified polyester resin (A-2) to be obtained by subjecting the polyester resin (a2) and the polyisocyanate (C) to reaction.

In production of the urethane modified polyester resin, it is preferred that the polyester resin (a1) or the polyester resin (a2) use two or more kinds of resins, each having different hydroxyl value. Preferred examples are a polyester resin (a-H) having 10 to 100 mg-KOH/g of the hydroxyl value and preferably 25 to 90 mg-KOH/g, and a polyester resin (a-L) having less than 20 mg-KOH/g and preferably less than 10 mg-KOH/g. The amount of the polyester resin (a-H) used is preferably 1 to 90 weight parts, more preferably 5 to 75 weight parts, and further preferably 5 to 70 weight parts, while the amount of the polyester resin (a-L) used is 10 to 99 weight parts, more preferably 25 to 95 weight parts, and further preferably 30 to 95 weight parts. When the polyester resin (a-H) is less than 1 weight parts, poor fixing properties result in some cases, while when it is more than 90 weight parts, poor fixing properties result in some cases.

The urethane modified polyester resin is created by crosslink reacting the polyester resin (A) and polyisocyanate (C). Accordingly the urethane modified polyester resin has high-molecular chain-extending and high molecular polymer component; therefore, the urethane modified polyester resin is preferable owing to its wide molecular weight distribution and accordingly an offset resistance is improved. The isocyanate-derived structure unit is preferably used owing to its high inter-molecular binding force and accordingly excellent mechanical durability results.

Polyisocyanate (C) is preferably 0.2 to 2 mole equivalent of isocyanate group for 1 mole equivalent of the hydroxyl group values of the polyester resin (a1) or the polyester resin (a2), and more preferably 0.5 to 1.5 mole equivalent. When the mole equivalent is less than 0.2, hot offset resistance is lowered. When the mole equivalent is more than 2 mole equivalent, it is insufficient from the viewpoint of safety in that there is a possibility that polyisocyanate in production of the resin exists in a monomer.

As polyisocyanate (C) of the present invention, there are mentioned, for example, diisocyanates such as hexamethylene diisocyanate, isophorone diisocyanate, diphenylmethane diisocyanate, xylylene diisocyanate, tetramethylene diisocyanate, norbornene diisocyanate or the like. The tri- or higher polyisocyanate can also be used.

The other resins can be used together as needed for the polyester resin (A) of the present invention. As specific examples, any known binder resins of a toner for electrostatic image development may be used. There can be mentioned, for example, homopolymers of styrene or its derivative, such as polystyrene, poly-p-chlorostyrene, poly-vinyltoluene and the like; styrene type copolymers such as styrene-p-chlorostyrene copolymer, styrene-vinyltoluene copolymer, styrene-vinyinaphthalene copolymer, styrene-acrylate copolymer, styrene-methacrylate copolymer, styrene-α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer and the like; and resins such as polyvinyl chloride, phenolic resin, natural modified phenolic resin, natural resin-modified maleic acid resin, acrylic resin, methacrylic resin, polyvinyl acetate, silicone resin, polyester resins other than mentioned above, polyurethane resin, polyamide resin, furan resin, epoxy resin, xylene resin, polyvinyl butyral, terpene resin, coumarone-indene resin, petroleum-based resin, crosslinked styrene type copolymer and the like. Naturally, these resins can be used in such an amount that the properties of the toner composition of the present invention are exhibited.

A binder resin for a toner of the present invention comprises the polyester resin (A) and the block copolymer (B) as described above. The glass transition temperature (Tg) of the binder resin for a toner used in the invention is preferably 40 to 70° C. from the viewpoints of blocking resistance (anti-cohesion of toner particles) or fixing properties.

The binder resin for a toner used in the present invention is preferably 4 to 100 of Mw (weight-average molecular weight)/Mn (number-average molecular weight) from the standpoints of offset resistance or fixing properties when a tetrahydrofuran soluble portion is measured by GPC (gel permeation chromatography), and more preferably 6 to 60.

A binder resin for a toner used in the present invention has a peak molecular weight of 1,000 to 30,000 when the tetrahydrofuran soluble portion is measured by GPC, more preferably 1,000 to 20,000 and further preferably 2,000 to 15,000. When the peak molecular weight is less than 1,000, deteriorated offset resistance and inferior mechanical durability result; when the peak molecular weight is more than 30,000, the fixing properties are deteriorated.

The THF insoluble portion to be contained in a binder resin for a toner used in the present invention is preferably 0 to 40% by weight in a resin composition. When the portion is more than 40% by weight, the fixing properties are worsened in some cases.

A density of a binder resin for a toner used in the present invention is preferably 1.20 to 1.27 g/cm$^3$. When a density is less than 1.20 g/cm$^3$, the mechanical durability is worsened in some cases, while when a density is more than 1.27 g/cm$^3$, the grindability is worsened in some cases; therefore the productivity is lowered.

When it needs to improve the low-temperature fixing properties and offset resistance of a binder resin for a toner of the present invention, waxes can be used together. Polyolefin wax such as polyethylene wax, polypropylene wax or the like may be used. Specific commercial products of the polyolefin wax include High Wax 800P, 400P, 200P, 100P, 720P, 420P, 320P, 405MP, 320MP, 4051E, 2203A, 1140H, NL800, NP055, NP105, NP505, NP805 and the like produced by Mitsui Chemicals Inc., Ltd. Examples of waxes which may be contained in the binder resin for a toner may include natural waxes such as ceramic wax, rice wax, sugar wax, urushi wax, beeswax, carnauba wax, candelilla wax, montan wax or the like. The amount thereof is preferably 0 to 20% by weight in the resin composition for a toner.

A wax may be added to dissolve upon polymerization of the polyester resin or may be added to dissolve in a melted state after polymerization of the polyester resin. Also the polyester resin and the block copolymer may be dissolved in the same solvent to obtain a resin solution, and then the solvent is removed by heating to obtain the resin compound. In addition, When the polyester resin is subjected to a urethanization reaction with a polyisocyanate to obtain the urethane modified polyester resin, the block copolymer may be added and melt-kneaded. The block copolymer may also be added and melt-kneaded in production of the toner.

Next, the toner of the present invention is explained in detail. The toner of the present invention contains the binder resin for a toner, charge-controlling agent, colorant and magnetic material. As the charge-controlling agent used in production of a toner resin of the present invention, known charge-controlling agents can be used singly or in combination. The charge-controlling agent is used in an amount necessary to allow the toner produced, to have an intended charge amount. It is preferably used in an amount of, for example, about 0.05 to 10 weight parts per 100 weight parts of the binder resin. As the positive charge-controlling agent, there can be mentioned, for example, nigrosine type dyes, quaternary ammonium salt compounds, triphenylmethane type compounds, imidazole type compounds and polyamine resins. As the negative charge-controlling agent, there can be mentioned, for example, metal (Cr, Co, Al or Fe)-contained azo type dyes, metal salicylate compounds, metal alkylsalicylate compounds and calixarene compounds.

In producing a toner of the present invention, there can be used, as the coloring agent, any coloring agent which has heretofore been known in toner production. As example thereof, there can be mentioned dyes and pigments, such as fatty acid metal salts, various carbon blacks, phthalocyanine type dyes, rhodamine type dyes, quinacridone type dyes, triallylmethane type dyes, anthraquinone type dyes, azo type dyes, diazo type dyes or the like. These coloring agents can be used singly or in combination of two or more kinds. The amount of coloring agent used is in the range of 0.05 to 10 weight parts per 100 weight parts of the binder resin for a toner.

The magnetic material which can be used in production of the toner of the present invention, can be any of alloys, compounds, etc. each containing a ferromagnetic element, which have heretofore been used in production of magnetic toner. As examples of the magnetic material, there can be mentioned iron oxides or compounds of bivalent metal and iron oxide, such as magnetite, maghemite, ferrite and the like; metals such as iron, cobalt, nickel and the like; alloys of such a metal and other metal such as aluminum, cobalt, copper, lead, magnesium, tin, zinc, antimony, beryllium, bismuth, cadmium, calcium, manganese, selenium, titanium, tungsten, vanadium or the like; and mixtures thereof. These magnetic materials have an average particle diameter of preferably about 0.1 to 2 micro-meters, more preferably about 0.1 to 0.5 micro-meters. The content of the magnetic material in the toner is ordinarily about 20 to 200 weight parts, preferably 40 to 150 weight parts per 100 weight parts of the binder resin. And the saturation magnetization of the toner is preferably 15 to 35 emu/g (measurement magnetic field: 1 kilo oersted).

The toner of the present invention can, if necessary, further employ a known additive being used in production of toners, for example, an lubricant, a flowability improver, an abrasive, a conductive grant agent, an anti-image peeling agent, etc. The method of introducing the additives is particularly not restricted and can adopt a known process. As examples thereof, there can be mentioned polyvinylidene fluoride, zinc stearate or the like as an lubricant, colloidal silica, aluminum oxide, titanium oxide as a flowability improver, cerium oxide, silundum, strontium titanate, tungsten carbide, calcium carbonate or the like as an abrasive, carbon black, tin oxide or the like as a conductive grant agent. Fine powders of fluorine-contained polymer such as polyvinylidene fluoride or the like are desirable from the viewpoints of the fluidity, abrasive properties, charging stability or the like.

The toner according to the present invention can be produced using the conventionally known process below. In general, the toner component materials as described above are satisfactorily mixed with mixers such as a ball mill, a Henschel mixer or the like. The resulting mixture is then finely kneaded using a heat kneader such as a heat roll kneader, a single screw or twin screw extruder or the like, and cool-solidified and then mechanically coarsely ground using a pulverizer such as a hammer mill. The coarsely ground mixture is finely ground using a jet mill, followed classification. But, method of producing the toner is particularly not restricted and, other toner component material is dispersed in solution of binder resin, and spray-dried to produce the toner, which is a so-called microcapsule method. Other methods can be arbitrarily adopted.

The toner of the present invention is mixed with a carrier and the resulting mixture can be used as a 2-component or 1.5-component developer. Or it can be used as a magnetic monocomponent developer comprising a magnetic powder in the toner, a non-magnetic monocomponent developer that does not use either a carrier or a magnetic powder, or a micro-toning developer. When the toner is used as a 2-component or 1.5-component developer, as carriers, there can be mentioned, for example, magnetic powder such as iron powder, ferrite powder, nickel powder or glass beads, etc., or of which surfaces are coated with a resin or the like. As resins to coat the surfaces of carriers, there can be mentioned, for example, styrene-acrylic acid ester copolymer, styrene-methacrylate copolymer, acrylate type copolymer, methacrylate type copolymer, fluorine-contained polymer, silicon-contained resin, polyamide resin, polyphenylene sulfide or the like, or compounds thereof. Among these, fluorine-contained polymer and silicon-contained resin are particularly preferred owing to their small forming of the spent toner.

A desirable weight-average particle diameter of the toner of the present invention is less than or equal to 10 micro-meters and preferably 3 to 10 micro-meters from the standpoint of the development features. The particle-size distribution can be measured, for example, with a coulter counter.

EXAMPLES

The present invention is described specifically below by way of Examples. However, the present invention is not restricted to these Examples. Also, "parts" hereinafter indicates parts by weight otherwise mentioned in advance.

The molecular weight and molecular weight distribution of the binder resin for a toner of the present invention are measured by GPC. The measurement is conducted in terms of the following conditions, based on the monodispersed standard polystyrene.

| Detector: | SHODEX RI-71S |
|---|---|
| Solvent: | Tetrahydrofuran |
| Column: | KF-G + KF-807L × 3 + KF800D |
| Flow rate: | 1.0 ml/min |
| Sample: | 0.25% THF solution |

The reliability of the measurement under the above conditions can be confirmed if Mw/Mn of NBS706 polystyrene sample (Mw=288,000, Mn=137,000, Mw/Mn=2.11) is 2.11±0.10.

The glass transition temperature (Tg) of the present invention was measured using DSC-20 (a product of Seiko Instruments Inc.) according to differential scanning calorimetry (DSC). About 10 mg of a sample was subjected to temperature elevation from −20 to 100° C. at a rate of 10° C./min to obtain a curve; in the curve, an intersection between the base line and the inclined line of the endothermic peak was determined, the Tg of the sample was determined from the intersection. It is desired that, before the above temperature elevation measurement, the sample resin is heated to about 200° C., is kept at that temperature for 5 minutes, and is cooled quickly to normal temperature (25° C.), in order to allow the sample to unify a thermal history.

The ratio of tetrahydrofuran (THF) insoluble portion of the present invention was obtained by the following measurement method. A tetrahydrofuran solution containing 5% by weight was prepared; the solution was stirred sufficiently to dissolve the soluble portion of the resin completely in the solvent; then, the solution was allowed to stand. After confirming that the insoluble portion of the resin and the supernatant liquid were separated completely, the supernatant liquid was analyzed and the amount of the soluble portion was calculated; thereby, the insoluble portion was determined.

The acid value of the present invention refers to mg of potassium hydroxide necessary to neutralize 1 g of the resin. The OH value refers to mg of potassium hydroxide necessary to neutralize the acid anhydride necessary to esterify the OH group present in 1 g of the resin.

The fixing properties of a toner were evaluated as follows.

(1) Fixing Properties

An unfixed image was formed using a copier produced by remodeling a commercial electrophotograph copier. This unfixed image was fixed using a hot roller fixing apparatus produced by remodeling of the fixing section of a commercial copier. The fixing was conducted at a fixing speed of the hot roll, of 300 mm/sec with the temperature of the hot roller being changed at intervals of 5° C. The fixed image obtained was rubbed 10 times by applying a load of 0.5 kg using a sand eraser (a product of Tombow Pencil Co., Ltd.), and the image densities before and after the rubbing test were measured using a Macbeth reflection densitometer. The lowest fixing temperature when the change of image density became 70% or more, was taken as the lowest fixing temperature of the toner.

Incidentally, the hot roller fixing apparatus used had no silicone oil feeder. The environmental conditions were normal temperature and normal humidity (temperature=22° C., relative humidity=55%).

○: lowest fixing temperature≦170° C.
Δ: 190° C.≧lowest fixing temperature≦170° C.
×: lowest fixing temperature>190° C.

(2) Offset Resistance (Temperature of Offset Appearance)

The offset resistance was evaluated as follows. An unfixed image was formed using the above copier; the toner image was transferred and fixed using the above hot roller fixing apparatus; then, a white transfer paper was fed into the hot roller fixing apparatus under the same conditions; and the appearance of toner staining the transfer paper was visually examined. This operation was repeated by gradually increasing the set temperature of the hot roller of the hot roller fixing apparatus. The lowest set temperature at which toner staining appeared on the transfer paper was taken as the temperature of offset appearance. The environmental conditions were normal temperature and normal humidity (temperature=22° C., relative humidity=55%).

○: temperature of offset appearance≧240° C.
Δ: 240° C.>temperature of offset appearance≧220° C.
×: 220° C.>temperature of offset appearance (3) Development Durability The development durability of a toner was evaluated by filling a toner in a commercial copier (a product of Toshiba Corporation, named Presio 5560), then conducting continuous copying of 100,000 copies, and evaluating the number of sheets fed from the start to the time when the deterioration of image density and image quality began.

○: No deterioration at 70,000th or more sheets
Δ: Deterioration began at not less than 50,000th and less than 70,000 th sheets
×: Deterioration began at less than 50,000th sheets (4) Grinding Productivity The coarsely ground resin was finely ground, at a flow rate of 20 g/min, using a jet grinder (IDS 2, a product of Nippon Pneumatic Co., Ltd.), followed by air classification, to obtain a toner fine powder having an average particle diameter of 10 micro-meters (5 micro-meters or less: 3% by weight, 20 micro-meters or more: 2% by weight).

○: Produced in the range of the conventional conditions
Δ: Search for conditions of production needed
×: Unable to produce Production Example of Block Copolymer Production of the block copolymer resin of the present invention has been conducted as follows. Production of a resin C-1 is next described in concrete terms. As for the resin C-2 to C-12, the resin units and monomer compositions are changed to the contents in Table 1 and others are the same as C-1. Also, resin analytical results are shown in Table 1 along with those of C-1.

In an autoclave flushed with an inert gas, 100 weight parts of heptane, 0.2 weight parts of ethylene chloride and 0.5 weight parts of triethyl aluminum are placed, while ethylene/propylene(1:1 weight ratio) is copolymerized at 0.5 atm (50.7 kPa), temperature of 43° C. for two hours. A polymerization solution is filtered and washed, and suspended with heptane of 100 weight parts, again. 0.5 weight parts of peroxide and 5 weight parts of styrene are added thereto, thereby polymerizing at 43° C. for ten hours. The resulting resin solution is filtered and washed, and then the solvent is removed to obtain the block copolymer C-1. The content of styrene is analyzed using heat decomposition gas chromatography.

As for the resins C-13 to C-17, commercial block copolymers are used. Specifically, there are used Kaliflex TR1101 (C-13), Kaliflex TR1112 (C-14), Kraton G1650 (C-15), Septon KL-1001 (C-16) and Tufprene A (C-17).

TABLE 1

| Resin | Block Copolymer | | | | | | | | | | | |
|---|---|---|---|---|---|---|---|---|---|---|---|---|
| | C-1 | C-2 | C-3 | C-4 | C-5 | C-6 | C-7 | C-8 | C-9 | C-10 | C-11 | C-12 |
| Amount of styrene used weight parts | 5 | 10 | 50 | 100 | 150 | 350 | 5 | 10 | 50 | 100 | 150 | 350 |
| Ethylene:propylene weight ratio | 1:1 | 1:0 | 1:1 | 1:1 | 1:1 | 1:1 | — | — | — | — | — | — |
| 2-butene:butadiene weight ratio | — | — | — | — | — | 1:1 | 1:1 | 1:1 | 1:1 | 1:1 | 1:1 | 1:1 |
| styrene component | 3.0 | 5.0 | 24.6 | 48.1 | 70.0 | 90.0 | 3.4 | 5.8 | 23.9 | 46.0 | 70.1 | 89.0 |

Production of the polyester resin and urethane modified polyester resin of the present invention has been conducted as follows. The polyester resin A-1 is next specifically described. As for the resins A-2 to A-5 and B-1 to B6, the resin units and monomer compositions are changed to the conditions in Table 2 and Table 3, and others are the same as A-1. Also, resin analytical results are shown in Table 2 and Table 3 along with those of A-1. In production of A-4 and B-5, recycled PETs are used.

In Table 2 and Table 3, an acid component mole % refers to a relative mole % based on 100 mole % of the total moles of PET, PBT, KB 300, diethylene glycol, triethylene glycol and trimethylolpropane that are polyhydric alcohol components.

Production Example of Polyester Resin (A-1)

A 5-liter, 4-necked flask was provided with a reflux condenser, a water-separating unit, a nitrogen gas inlet tube, a thermometer and a stirrer. Thereinto were fed 50 mole % of a recycled PET flake (weight-average molecular weight: 75,000) on the ethylene glycol unit in the PET, 22 mole % of Actcall KB300 (a product of bisphenol A derivative by Mitsui Takeda Chemicals, Inc.), 20.0 mole % of triethylene glycol, 8 mole % of trimethylolpropane and 36 mole % of terephthalic acid (based on the total moles of 4 kinds of the polyhydric alcohol). Further, dibutyl tin oxide of a catalyst was fed in an amount of 0.5 weight parts to the total amount of the reaction raw material. Depolymerization and/or dehydration and polycondensation were conducted at 240° C. with nitrogen being introduced into the flask. When the acid value of the reaction mixture reached a predetermined level, the reaction mixture was taken out of the flask, cooled, and ground to obtain a resin A-1. In determining whether the reaction is terminated, the acid value of a sampled resin is used, which is a normally conducted method.

TABLE 2

Polyester Resin

| Resin | A-1 | A-2 | A-3 | A-4 | A-5 |
|---|---|---|---|---|---|
| PET (mol %) | 50 | — | — | 25 | 62 |
| PBT (mol %) | — | — | 50 | 25 | — |
| KB300 (mol %) | 22 | 28 | 22 | 22 | 24 |
| Diethylene glycol (mole %) | — | 64 | — | — | — |
| Triethylene glycol (mole %) | 20 | — | 20 | 20 | 4 |
| Trimethylolpropane (mole %) | 8 | 8 | 8 | 8 | 10 |
| Terephthalic acid (mole %) | 36 | — | 36 | 36 | 18 |
| Isophthalic acid (mole %) | — | 84 | — | — | — |
| Benzoic acid (mole %) | — | — | — | — | 18 |
| isododecenyl succinic anhydride (mol %) | — | — | — | — | 10 |
| Hydroxyl group value (mgKOH/g) | 50 | 52 | 49 | 49 | 18 |

TABLE 3

Polyester Resin

| Resin | B-1 | B-2 | B-3 | B-4 | B-5 | B-6 |
|---|---|---|---|---|---|---|
| PET (mol %) | 70 | 70 | — | — | 34 | — |
| PBT (mol %) | — | — | — | 67 | 33 | — |
| KB300 (mol %) | 28 | 30 | 94 | 28 | 28 | 15 |
| Diethylene glycol (mole %) | — | — | — | — | — | 35 |
| Triethylene glycol (mole %) | — | — | — | — | — | — |
| Trimethylolpropane (mole %) | 2 | — | 6 | 5 | 5 | — |
| Terephthalic acid (mole %) | 33 | 35 | — | 33 | 33 | 32 |
| Isophthalic acid (mole %) | — | — | 103 | — | — | — |
| Benzoic acid (mole %) | 20 | 18 | 18 | 20 | 20 | — |
| isododecenyl succinic anhydride (mol %) | — | — | — | — | — | 5 |
| 1,2,4-benzen tricarboxylic anhydride (mol %) | — | — | — | — | — | 12 |
| Hydroxyl group value (mgKOH/g) | <5 | <5 | <5 | <5 | <5 | <5 |

The embodiments of the present invention are described specifically for a representative case, i.e. Example 1. Also for resins 2 to 11, i.e. Examples 2 to 30 and Comparative Examples 1 to 4, resins and toners were obtained and evaluated in the same manner as in Example 1 with the only difference being that the proportions of resin and the ratios of tolylene diisocyanate added have been changed to those described in Table 4 to Table 7. The results of resin analysis and the properties of toner are shown in Table 4 to Table 7, together with those of Example 1. Incidentally, no tolylene diisocyanate was added to the resin 10.

Example 1

30 weight parts of resin A-1 as the resin (A), 70 weight parts of resin B-1 as the resin (B), and 2 weight parts of tolylene diisocyanate were kneaded and reacted in a twin screw extruder to obtain resin 1. The resin had a Tg of 57.9C, a Mw/Mn of 21.4 as measured by GPC, and a peak molecular weight of 6,000. The resin also had a THF insoluble component of 4% by weight.

100 weight parts of a resin 1, 6 weight parts of a carbon black (MA-100, a product of Mitsubishi Chemical Corporation) and 1.5 weight parts of a charge control agent (BONTRON E-84, a product of Orient Chemical Instruments Inc.) and 2.0 weight parts of a polypropylene wax (High Wax NP105; a product of Mitsui Chemicals, Inc. Ltd.) were dispersed and mixed using a Henschel mixer; the resulting material was melt-kneaded at 120° C. using a twin screw extruder PCM-30 (a product of Ikegai Corporation) to obtain a toner composition in the bulk state. The resin after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3% by weight, 20 micro-meters or more: 2% by weight). 100 weight parts of the toner, 0.5 weight parts of a hydrophobic silica (Aerosil R-972, a product of Nippon Aerosil Co., Ltd.) was mixed using a Henschel mixer, feeding from the exterior to obtain toner particles. The toner particles were measured for the fixing properties, offset resistance and grinding productivity.

Example 31

The toner is produced in the same manner as in Example 1, except that the method of adding the block copolymer has been changed as follows. That is, 30 weight parts of resin A-1, 70 weight parts of resin B-1, and 4.8 weight parts of the block copolymer C-4 were dissolved and mixed to 100 parts by weight of xylene in the homogeneous state. A solvent is removed at 20 mmHg, 180° C. to obtain a resin compound (resin 12). The results are shown in Table 6.

Example 32

The toner is produced in the same manner as in Example 1, except that the method of adding the block copolymer has been changed as follows. That is, when 30 weight parts of resin A-1, 70 weight parts of resin B-1, and 2 parts by weight of tolylene diisocyanate were kneaded and reacted in a twin screw extruder, 4.8 weight parts of the block copolymer was added thereto to obtain a resin compound (resin 13). The results are shown in Table 6.

The binder resin for a toner comprising the polyester resin (A) of the present invention and the block copolymer (B) and the toner using these are superior in the fixing properties, offset resistance and development durability. Thus the binder resin for a toner and the toner obtained according to the present invention can fully satisfy the recently increasing needs of copiers and printers with a high speed and low-temperature fixing properties.

TABLE 4

Production and Evaluation of Toner

| Example No.<br>Resin | Example 1<br>Resin 1 | Example 2<br>Resin 1 | Example 3<br>Resin 1 | Example 4<br>Resin 1 | Example 5<br>Resin 1 | Example 6<br>Resin 1 | Example 7<br>Resin 1 | Example 8<br>Resin 1 | Example 9<br>Resin 1 | Example 10<br>Resin 1 | Example 11<br>Resin 1 |
|---|---|---|---|---|---|---|---|---|---|---|---|
| Resin A | | | | | | | | | | | |
| Type | A-1 | A-1 | A-1 | A-1 | A-1 | A-1 | A-1 | A-1 | A-1 | A-1 | A-1 |
| (% by weight) | 30 | 30 | 30 | 30 | 30 | 30 | 30 | 30 | 30 | 30 | 30 |
| Resin B | | | | | | | | | | | |
| Type | B-1 | B-1 | B-1 | B-1 | B-1 | B-1 | B-1 | B-1 | B-1 | B-1 | B-1 |
| (% by weight) | 70 | 70 | 70 | 70 | 70 | 70 | 70 | 70 | 70 | 70 | 70 |
| Tolylene diisocyanate (weight %) | 2 | 2 | 2 | 2 | 2 | 2 | 2 | -2 | 2 | 2 | 2 |
| Tg (° C.) | 57.9 | 57.9 | 57.9 | 57.9 | 57.9 | 57.9 | 57.9 | 57.9 | 57.9 | 57.9 | 57.9 |
| GPC | | | | | | | | | | | |
| Mw/Mn | 21.4 | 21.4 | 21.4 | 21.4 | 21.4 | 21.4 | 21.4 | 21.4 | 21.4 | 21.4 | 21.4 |
| Peak molecular weight | 6000 | 6000 | 6000 | 6000 | 6000 | 6000 | 6000 | 6000 | 6000 | 6000 | 6000 |
| THF insoluble portion (weight %) | 4 | 4 | 4 | 4 | 4 | 4 | 4 | 4 | 4 | 4 | 4 |
| Block copolymer | | | | | | | | | | | |
| Type | C-1 | C-2 | C-3 | C-4 | C-5 | C-6 | C-7 | C-8 | C-9 | C-10 | C-11 |
| Amount | 5 | 5 | 5 | 5 | 5 | 5 | 5 | 5 | 5 | 5 | 5 |
| Time | 3 | 3 | 3 | 3 | 3 | 3 | 3 | 3 | 3 | 3 | 3 |
| Fixing properties | ○ | ○ | ○ | ○ | ○ | ○ | ○ | ○ | ○ | ○ | ○ |
| Offset resistance | ○ | ○ | ○ | ○ | ○ | ○ | ○ | ○ | ○ | ○ | ○ |
| Development durability | Δ | ○ | ○ | ○ | ○ | Δ | Δ | Δ | ○ | ○ | ○ |
| Productivity of grindability | ○ | ○ | ○ | ○ | ○ | ○ | ○ | ○ | ○ | ○ | ○ |

Time of copolymer resin added
1: after production of resins
2: in urethane reaction
3: in production of toners

TABLE 5

Production and Evaluation of Tone

| Example No.<br>Resin | Example 12<br>Resin 1 | Example 13<br>Resin 1 | Example 14<br>Resin 1 | Example 15<br>Resin 1 | Example 16<br>Resin 1 | Example 17<br>Resin 1 | Example 18<br>Resin 1 | Example 19<br>Resin 1 | Example 20<br>Resin 1 | Example 21<br>Resin 1 | Example 22<br>Resin 2 |
|---|---|---|---|---|---|---|---|---|---|---|---|
| Resin A | | | | | | | | | | | |
| Type | A-1 | A-1 | A-1 | A-1 | A-1 | A-1 | A-1 | A-1 | A-1 | A-1 | A-1 |
| (% by weight) | 30 | 30 | 30 | 30 | 30 | 30 | 30 | 30 | 30 | 30 | 20 |
| Resin B | | | | | | | | | | | |
| Type | B-1 | B-1 | B-1 | B-1 | B-1 | B-1 | B-1 | B-1 | B-1 | B-1 | B-1 |
| (% by weight) | 70 | 70 | 70 | 70 | 70 | 70 | 70 | 70 | 70 | 70 | 80 |
| Tolylene diisocyanate (weight %) | 2 | 2 | 2 | 2 | 2 | 2 | 2 | 2 | 2 | 2 | 1.7 |
| Tg (° C.) | 57.9 | 57.9 | 57.9 | 57.9 | 57.9 | 57.9 | 57.9 | 57.9 | 57.9 | 57.9 | 56.8 |
| GPC | | | | | | | | | | | |
| Mw/Mn | 21.4 | 21.4 | 21.4 | 21.4 | 21.4 | 21.4 | 21.4 | 21.4 | 21.4 | 21.4 | 27.6 |
| Peak molecular weight | 6000 | 6000 | 6000 | 6000 | 6000 | 6000 | 6000 | 6000 | 6000 | 6000 | 6000 |
| THF insoluble portion (weight %) | 4 | 4 | 4 | 4 | 4 | 4 | 4 | 4 | 4 | 4 | 5 |
| Block copolymer | | | | | | | | | | | |
| Type | C-12 | C-13 | C-14 | C-15 | C-16 | C-4 | C-4 | C-4 | C-4 | C-4 | C-4 |
| Amount | 5 | 5 | 5 | 5 | 5 | 0.1 | 1 | 10 | 15 | 20 | 5 |
| Time | 3 | 3 | 3 | 3 | 3 | 3 | 3 | 3 | 3 | 3 | 3 |
| Fixing properties | ○ | ○ | ○ | ○ | ○ | ○ | ○ | ○ | ○ | ○ | ○ |
| Offset resistance | ○ | ○ | ○ | ○ | ○ | ○ | ○ | ○ | ○ | ○ | ○ |
| Development durability | Δ | ○ | ○ | ○ | ○ | ○ | ○ | ○ | Δ | Δ | ○ |
| Productivity of grindability | ○ | ○ | ○ | ○ | ○ | Δ | ○ | ○ | ○ | ○ | ○ |

Time of copolymer resin added
1: after production of resins
2: in urethane reaction
3: in production of toners

TABLE 6

Production and Evaluation of Toner

| Example No.<br>Resin | Example 23<br>Resin 3 | Example 24<br>Resin 4 | Example 25<br>Resin 5 | Example 26<br>Resin 6 | Example 27<br>Resin 7 | Example 28<br>Resin 8 | Example 29<br>Resin 9 | Example 30<br>Resin 10 | Example 31<br>Resin 12 | Example 32<br>Resin 13 |
|---|---|---|---|---|---|---|---|---|---|---|
| Resin A | | | | | | | | | | |
| Type | A-1 | A-2 | A-2 | A-3 | A-4 | A-5 | A-5 | — | A-1 | A-1 |
| (% by weight) | 30 | 30 | 20 | 25 | 30 | 100 | 100 | — | 30 | 30 |
| Resin B | | | | | | | | | | |
| Type | B-2 | B-3 | B-3 | B-4 | B-5 | — | — | B-6 | B-1 | B-1 |
| (% by weight) | 70 | 70 | 80 | 75 | 70 | — | — | 100 | 70 | 70 |
| Tolylene diisocyanate (weight %) | 1.9 | 1.8 | 1.5 | 1.7 | 1.6 | 1.9 | 1.5 | | 2 | 2 |
| Tg (° C.) | 62.5 | 55.5 | 55.8 | 57.2 | 57.1 | 55.5 | 54.1 | 59.6 | 57.9 | 57.9 |
| GPC | | | | | | | | | | |
| Mw/Mn | 29.4 | 11.2 | 13.4 | 15.2 | 24.3 | 12.6 | 6.1 | 22.5 | 21.4 | 21.4 |
| Peak molecular weight | 6500 | 6000 | 5500 | 6000 | 6500 | 10000 | 8000 | 28000 | 6000 | 6000 |
| THF insoluble portion (weight %) | 7 | 2 | 4 | 1 | 3 | 0 | 0 | 5 | 9 | 9 |
| Block copolymer | | | | | | | | | | |
| Type | C-4 | C-4 | C-4 | C-4 | C-4 | C-4 | C-4 | C-4 | C-4 | C-4 |
| Amount | 5 | 5 | 5 | 5 | 5 | 5 | 5 | 5 | 5 | 5 |
| Time | 3 | 3 | 3 | 3 | 3 | 3 | 3 | 3 | 1 | 2 |
| Fixing properties | ○ | ○ | ○ | ○ | ○ | ○ | ○ | Δ | ○ | ○ |
| Offset resistance | ○ | ○ | Δ | ○ | ○ | Δ | Δ | ○ | ○ | ○ |
| Development durability | ○ | ○ | Δ | ○ | ○ | Δ | Δ | ○ | ○ | ○ |
| Productivity of grindability | ○ | ○ | ○ | ○ | ○ | ○ | ○ | Δ | ○ | ○ |

Time of copolymer resin added
1: after production of resins
2: in urethane reaction
3: in production of toners

TABLE 7

Production and Evaluation of Toner

| Example No.<br>Resin | Comparative Example 1<br>Resin 1 | Comparative Example 2<br>Resin 3 | Comparative Example 3<br>Resin 5 | Comparative Example 4<br>Resin 10 |
|---|---|---|---|---|
| Resin A | | | | |
| Type | A-1 | A-1 | A-2 | — |
| (% by weight) | 30 | 30 | 20 | — |
| Resin B | | | | |
| Type | B-1 | B-2 | B-3 | B-6 |
| (% by weight) | 70 | 70 | 80 | 100 |
| Tolylene diisocyanate (weight %) | 2 | 1.9 | 1.5 | |
| Tg (° C.) | 57.9 | 62.5 | 55.8 | 59.6 |
| GPC | | | | |
| Mw/Mn | 21.4 | 29.4 | 13.4 | 22.5 |
| Peak molecular weight | 6000 | 6500 | 5500 | 28000 |
| THF insoluble portion (weight %) | 4 | 7 | 4 | 5 |
| Block copolymer | | | | |
| Type | C-4 | C-4 | C-4 | C-4 |
| Amount | ○ | ○ | ○ | ○ |
| Time | — | — | — | — |
| Fixing properties | ○ | ○ | ○ | X |
| Offset resistance | ○ | ○ | X | ○ |
| Development durability | ○ | ○ | X | ○ |
| Productivity of grindability | Δ | Δ | ○ | X |

Time of copolymer resin added
1: after production of resins
2: in urethane reaction
3: in production of toners

What is claimed is:

1. A binder resin for a toner containing:
   (A) a polyester resin which is a urethane modified polyester resin (A-2) obtained by reacting
   a polyisocyanate (C) and
   a polyester resin (a2) made from
   a polyethylene terephthalate (PET) and/or
   a polybutylene terephthalate (PBT)
   a polycarboxylic acid and
   polyhydric alchool; and
   (B) a block copolymer comprising:
   a block comprising a sequence of ethylenically unsaturated hydrocarbon derived constituent units and/or conjugated diene type hydrocarbon-derived constituent units, and
   a block comprising a sequence of styrene-derived constituent units; and/or
   the hydrogenated product of the block copolymer.

2. A binder resin for a toner according to claim 1, containing:

100 weight parts of the polyester resin (A) and 0.1 to 20 weight parts of the block copolymer (B).

3. A binder resin for a toner according to claim 1 wherein the tetrahydrofuran (THF) soluble portion has a Mw (weight-average molecular weight)/Mn(number-average molecular weight) of 4 to 100 as measured by gel permeation chromatography(GPC).

4. A binder resin for a toner according to claim 3, wherein the tetrahydrofuran (THF) soluble portion has a peak molecular weight of 1,000 to 30,000 as measured by gel permeation chromatography (GPC), and a glass transition temperature (Tg) of 40 to 75° C.

5. A binder resin for a toner according to claim 4, wherein a styrene-derived constituent unit of the block copolymer (B) is 3 to 90% by weight.

6. A toner containing a binder resin for a toner according to claim 1.

* * * * *